(12) United States Patent
Ouellette et al.

(10) Patent No.: US 8,127,802 B2
(45) Date of Patent: Mar. 6, 2012

(54) PI-PREFORM WITH VARIABLE WIDTH CLEVIS

(75) Inventors: Kenneth Ouellette, Kennebunk, ME (US); Jonathan Goering, York, ME (US); Brock Gilbertson, Saco, ME (US)

(73) Assignee: Albany Engineered Composites, Inc., Rochester, NH (US)

( * ) Notice: Subject to any disclaimer, the term of this patent is extended or adjusted under 35 U.S.C. 154(b) by 813 days.

(21) Appl. No.: 12/260,689

(22) Filed: Oct. 29, 2008

(65) Prior Publication Data
US 2010/0105268 A1 Apr. 29, 2010

(51) Int. Cl.
*D03D 13/00* (2006.01)
*D03D 11/02* (2006.01)
*D03D 41/00* (2006.01)
*D03D 25/00* (2006.01)

(52) U.S. Cl. ............ 139/11; 139/383 R; 139/DIG. 1; 442/205

(58) Field of Classification Search .......... None
See application file for complete search history.

(56) References Cited

U.S. PATENT DOCUMENTS

| | | |
|---|---|---|
| 4,256,790 A | 3/1981 | Lackman et al. |
| 4,331,349 A | 5/1982 | Funahashi |
| 4,331,495 A | 5/1982 | Lackman et al. |
| 4,922,968 A | 5/1990 | Bottger et al. |
| 5,085,252 A | 2/1992 | Mohamed et al. |
| 5,429,853 A | 7/1995 | Darrieux |
| 5,772,821 A | 6/1998 | Yasui et al. |
| 5,783,279 A | 7/1998 | Edgson et al. |
| 5,785,094 A | 7/1998 | Yoshida |
| 5,899,241 A | 5/1999 | David et al. |
| 6,010,652 A | 1/2000 | Yoshida |
| 6,019,138 A | 2/2000 | Malek et al. |
| 6,103,337 A | 8/2000 | Burgess |
| 6,283,168 B1 | 9/2001 | Gu et al. |
| 6,374,570 B1 | 4/2002 | McKague, Jr. |
| 6,418,973 B1 | 7/2002 | Cox et al. |
| 6,446,675 B1* | 9/2002 | Goering .................... 139/11 |

(Continued)

FOREIGN PATENT DOCUMENTS

WO WO 02/16197 A 2/2002

(Continued)

OTHER PUBLICATIONS

International Search Report issued by European Patent Office acting as the International Searching Authority for corresponding international application PCT/US2009/062216, mailed Mar. 1, 2010.

*Primary Examiner* — Bobby Muromoto, Jr.
(74) *Attorney, Agent, or Firm* — Frommer Lawrence & Haug LLP; Ronald R. Santucci (57) ABSTRACT

A woven preform for a reinforced composite material, which may be woven flat and folded into shape. The preform has a three-dimensional weave architecture with fill fibers woven to provide layer-to-layer interlocking of layers of warp fiber as well as interlocking of fibers within each layer. At least two legs extend from a base, the base and legs each having at least two layers of warp fibers. The legs may be parallel or angled to each other, or may have a variable width clevis in between. The outer ends of the base and/or the legs preferably have tapers formed from terminating layers of warp fibers in a stepped pattern.

18 Claims, 8 Drawing Sheets

U.S. PATENT DOCUMENTS

| | | | |
|---|---|---|---|
| 6,520,706 B1 | 2/2003 | McKague, Jr. et al. | |
| 6,589,472 B1 | 7/2003 | Benson et al. | |
| 6,676,882 B2 | 1/2004 | Benson et al. | |
| 6,712,099 B2 | 3/2004 | Schmidt et al. | |
| 6,718,713 B2 | 4/2004 | McKague, Jr. et al. | |
| 6,733,211 B1 | 5/2004 | Durie | |
| 6,733,862 B2 * | 5/2004 | Goering | 428/121 |
| 6,821,368 B1 | 11/2004 | Benson et al. | |
| 6,835,261 B2 | 12/2004 | Schmidt | |
| 6,874,543 B2 * | 4/2005 | Schmidt et al. | 139/383 R |
| 6,890,612 B2 * | 5/2005 | Goering | 428/57 |
| 6,899,941 B2 * | 5/2005 | Goering et al. | 428/121 |
| 6,913,045 B2 | 7/2005 | Fantino et al. | |
| 7,014,805 B1 | 3/2006 | Reis et al. | |
| 7,077,167 B2 | 7/2006 | Nayfeh et al. | |
| 7,198,692 B2 | 4/2007 | Bersuch et al. | |
| 7,244,487 B2 | 7/2007 | Brantley et al. | |
| 7,413,999 B2 * | 8/2008 | Goering | 442/181 |
| 7,655,581 B2 * | 2/2010 | Goering | 442/205 |
| 7,670,969 B2 * | 3/2010 | Blackden et al. | 442/239 |
| 7,712,488 B2 * | 5/2010 | Goering et al. | 139/384 R |
| 7,713,893 B2 * | 5/2010 | Goering | 442/246 |
| 2002/0081416 A1 * | 6/2002 | Goering | 428/121 |
| 2002/0081925 A1 * | 6/2002 | Goering | 442/215 |
| 2002/0081926 A1 * | 6/2002 | Goering et al. | 442/218 |
| 2002/0090874 A1 | 7/2002 | McKague, Jr. et al. | |
| 2002/0192450 A1 | 12/2002 | Schmidt et al. | |
| 2003/0041948 A1 | 3/2003 | Bersuch et al. | |
| 2003/0056847 A1 | 3/2003 | Schmidt et al. | |
| 2003/0116267 A1 | 6/2003 | Sheahen et al. | |
| 2004/0023581 A1 | 2/2004 | Bersuch et al. | |
| 2006/0121809 A1 * | 6/2006 | Goering | 442/246 |
| 2007/0120288 A1 | 5/2007 | Ashton et al. | |
| 2008/0009210 A1 * | 1/2008 | Goering | 442/181 |
| 2008/0261474 A1 * | 10/2008 | Goering | 442/195 |
| 2009/0149100 A1 * | 6/2009 | Goering | 442/203 |
| 2009/0163100 A1 * | 6/2009 | Goering | 442/205 |
| 2009/0202763 A1 * | 8/2009 | Rose et al. | 428/36.1 |
| 2009/0247034 A1 * | 10/2009 | Goering et al. | 442/206 |
| 2009/0311462 A1 * | 12/2009 | Goering | 428/99 |
| 2009/0325443 A1 * | 12/2009 | Blackden et al. | 442/203 |
| 2010/0105268 A1 * | 4/2010 | Ouellette et al. | 442/203 |
| 2010/0105269 A1 * | 4/2010 | Goering et al. | 442/205 |
| 2010/0167007 A1 * | 7/2010 | Goering | 428/124 |

FOREIGN PATENT DOCUMENTS

| | | | |
|---|---|---|---|
| WO | WO 02/066235 A | 8/2002 | |

* cited by examiner

PI-PREFORM WITH VARIABLE WIDTH CLEVIS

CROSS-REFERENCE TO RELATED APPLICATIONS

Related applications are U.S. patent application Ser. No. 12/059,060 filed Mar. 31, 2008 and U.S. patent application Ser. No. 12/260,689 filed Oct. 29, 2008.

BACKGROUND OF THE INVENTION

1. Field of the Invention

This invention generally relates to woven preforms and particularly relates to woven preform used in a reinforced composite material, which can be woven flat and folded into its final shape without producing undesirable loops in the preform.

2. Incorporation by Reference

All patents, patent applications, documents, references, manufacturer's instructions, descriptions, product specifications, and product sheets for any products mentioned herein are incorporated herein by reference, and may be employed in the practice of the invention.

3. Description of the Prior Art

The use of reinforced composite materials to produce structural components is now widespread, particularly in applications where their desirable characteristics are sought of being light in weight, strong, tough, thermally resistant, self-supporting and adaptable to being formed and shaped. Such components are used, for example, in aeronautical, aerospace, satellite, recreational (as in racing boats and autos), and other applications.

Typically such components consist of reinforcement materials embedded in matrix materials. The reinforcement component may be made from materials such as glass, carbon, ceramic, aramid, polyethylene, and/or other materials which exhibit desired physical, thermal, chemical and/or other properties, chief among which is great strength against stress failure. Through the use of such reinforcement materials, which ultimately become a constituent element of the completed component, the desired characteristics of the reinforcement materials, such as very high strength, are imparted to the completed composite component. The constituent reinforcement materials typically, may be woven, knitted or otherwise oriented into desired configurations and shapes for reinforcement preforms. Usually particular attention is paid to ensure the optimum utilization of the properties for which the constituent reinforcing materials have been selected. Usually such reinforcement preforms are combined with matrix material to form desired finished components or to produce working stock for the ultimate production of finished components.

After the desired reinforcement preform has been constructed, matrix material may be introduced to and into the preform, so that typically the reinforcement preform becomes encased in the matrix material and matrix material fills the interstitial areas between the constituent elements of the reinforcement preform. The matrix material may be any of a wide variety of materials, such as epoxy, polyester, vinyl-ester, ceramic, carbon and/or other materials, which also exhibit desired physical, thermal, chemical, and/or other properties. The materials chosen for use as the matrix may or may not be the same as that of the reinforcement preform and may or may not have comparable physical, chemical, thermal or other properties. Typically, however, they will not be of the same materials or have comparable physical, chemical, thermal or other properties, since a usual objective sought in using composites in the first place is to achieve a combination of characteristics in the finished product that is not attainable through the use of one constituent material alone. So combined, the reinforcement preform and the matrix material may then be cured and stabilized in the same operation by thermosetting or other known methods, and then subjected to other operations toward producing the desired component. It is significant to note at this point that after being so cured, the then solidified masses of the matrix material normally are very strongly adhered to the reinforcing material (e.g., the reinforcement preform). As a result, stress on the finished component, particularly via its matrix material acting as an adhesive between fibers, may be effectively transferred to and borne by the constituent material of the reinforcement preform.

Frequently, it is desired to produce components in configurations that are other than such simple geometric shapes as (per se) plates, sheets, rectangular or square solids, etc. A way to do this is to combine such basic geometric shapes into the desired more complex forms. One such typical combination is made by joining reinforcement preforms made as described above at an angle (typically a right-angle) with respect to each, other. Usual purposes for such angular arrangements of joined reinforcement preforms are to create a desired shape to form a reinforcement preform that includes one or more end walls or "T" intersections for example, or to strengthen the resulting combination of reinforcement preforms and the composite structure which it produces against deflection or failure upon it being exposed to exterior forces, such as pressure or tension. In any case, a related consideration is to make each juncture between the constituent components as strong as possible. Given the desired very high strength of the reinforcement preform constituents per se, weakness of the juncture becomes, effectively, a "weak link" in a structural "chain".

An example of an intersecting configuration is set forth in U.S. Pat. No. 6,103,337, the disclosure of which is incorporated herein by reference. This reference sets forth an effective means of joining together two reinforcing plates into a T-form.

Various other proposals have been made in the past for making such junctures. It has been proposed to form and cure a panel element and an angled stiffening element separate from each other, with the latter having a single panel contact surface or being bifurcated at one end to form two divergent, co-planar panel contact surfaces. The two components are then joined by adhesively bonding the panel contact surface (s) of the stiffening element to a contact surface of the other component using thermosetting adhesive or other adhesive material. However, when tension is applied to the cured panel or the skin of the composite structure, loads at unacceptably low values resulted in "peel" forces which separate the stiffening element from the panel at their interface since the effective strength of the joint is that of the matrix material and not of the adhesive.

The use of metal bolts or rivets at the interface of such components is unacceptable because such additions at least partially destroy and weaken the integrity of composite structures themselves, add weight, and introduce differences in the coefficient of thermal expansion as between such elements and the surrounding material.

Other approaches to solving this problem have been based on the concept of introducing high strength fibers across the joint area through the use of such methods as stitching one of the components to the other and relying upon the stitching thread to introduce such strengthening fibers into and across the juncture site. One such approach is shown in U.S. Pat. No. 4,331,495 and its divisional counterpart, U.S. Pat. No. 4,256,790. These patents disclose junctures having been made between a first and second composite panel made from adhesively bonded fiber plies. The first panel is bifurcated at one end to form two divergent, co-planar panel contact surfaces in the prior art manner, that have been joined to the second panel by stitches of uncured flexible composite thread through both panels. The panels and thread have then been "co-cured": i.e., cured simultaneously. Another method to improve upon junction strength is set forth in U.S. Pat. No. 5,429,853.

While the prior art has sought to improve upon the structural integrity of the reinforced composite and has achieved success, particularly in the case of U.S. Pat. No. 6,103,337, there exists a desire to improve thereon or address the problem through an approach different from the use of adhesives or mechanical coupling. In this regard, one approach might be by creating a woven three dimensional ("3D") structure by specialized machines. However, the expense involved is considerable and rarely is it desirable to have a weaving machine directed to creating a simple structure. Despite this fact, 3D preforms which can be processed into fiber reinforced composite components are desirable because they provide increased strength relative to conventional two dimensional laminated composites. These preforms are particularly useful in applications that require the composite to carry out-of-plane loads. However, the prior-art preforms discussed above have been limited in their ability to withstand high out-of-plane loads, to be woven in an automated loom process, and to provide for varying thickness of portions of the preform. Weave construction and automation of preform weaving was in its infancy and provided only a small advantage over conventional laminated, fiber-wound, or braided composites, limiting the versatility of the preforms.

Another approach would be to weave a two dimensional ("2D") structure and fold it into 3D shape. However, this typically results in parts that distort when the preform is folded. The distortion occurs because the lengths of fiber as-woven are different than what they should be when the preform is folded. This causes dimples and ripples in areas where the as-woven fiber lengths are too short, and buckles in the areas where fiber lengths are too long. An example of a 3D preform weave architecture, which may lead to ripples or loops in areas where the preform is folded, is disclosed in U.S. Pat. No. 6,874,543, the entire content of which is incorporated herein by reference. Fiber preforms with specific structural shapes, such as for example 'T', 'I', 'H' or 'Pi' cross sections, can be woven on a conventional shuttle loom, and several existing patents describe the method of weaving such structures (U.S. Pat. Nos. 6,446,675 and 6,712,099, for example). In all prior art, however, the preforms have been constructed so that the cross section is uniform in the direction of the warp fiber.

These preforms are often processed into composite components using a reinforcement technique such as, for example, resin transfer molding, and used as stiffening and/or joining members in aircraft structures. In the case of a 'Pi' preform, a web is typically inserted into the space between the upstanding legs i.e. the clevis.

A uniform width clevis is appropriate for many applications. However, there are other cases where it is detrimental. For example, a uniform width clevis requires the web to be of a uniform thickness, and this thickness is sized by the most highly loaded area of the structure. This means that potential weight saving, which could be achieved by thinning out the web in more lightly loaded areas, can not be realized.

SUMMARY OF THE INVENTION

The invention is a method for weaving a fiber preform with multiple legs such that these legs are not necessarily parallel to each another. An example, according to one embodiment of the invention, is a 'Pi' preform with a variable width clevis i.e. the width between the upstanding legs varies along the length of the preform.

The variable width clevis is achieved by selectively dropping some warp fibers out of the parts of the preform that form the upstanding legs, while simultaneously adding warp fibers in other areas. To widen the clevis, warp fibers are dropped out at the base of the upstanding leg and added at the tip. The opposite is done to make the clevis narrower.

The instant method can also be used for making other cross-sectional shapes such as a 'T' shape or 'T' stiffener that has the blade of the 'T' running at an angle relative to the top of the 'T' or other shapes such as H-shaped or I-shaped.

The instant method can be used to weave preforms with variable thickness or variable height legs that may be parallel or angled to each other. The preform can be woven using any convenient pattern for the warp fiber, i.e., ply-to-ply, through thickness angle interlock, orthogonal, etc. While carbon fiber is preferred, the invention is applicable to practically any other fiber type.

It is a further object of the invention to provide for a 3D preform which is of a design which is an alternative to and/or an improvement on existing preforms and/or reinforced composite structures heretofore available.

It is another object of the invention to provide for a novel method of producing a 3D preform with improved quality, which eliminates loop formation, and reduces weaving time by replacing five shuttle motions with three, thereby providing for a better preform in lesser amount of time.

It is a further object of the invention to provide for such a 3D preform which may be folded into shape without distortion of the fibers comprising the preform.

Yet another object of the invention is to provide for a 3D preform which is particularly useful in forming Pi-shaped reinforced composites.

These and other objects and advantages are achieved by providing for a 3D woven preform that can be woven flat and then folded into its final shape prior to impregnation of resin without producing an undesirable distortion in the fibers. This is accomplished by adjusting the length of the fibers during weaving such that the fibers lengths are equalized when the preform is folded into shape providing for a smooth transition at the fold. This technique, while particularly suited for forming Pi-shaped woven preforms, may be utilized with various shapes. Also, while reference is made to woven preforms, its applicability to non-wovens, such as braided or stitched bonded, for example, will be apparent to one skilled in the art.

Accordingly, one embodiment of the invention is a preform for mechanical or structural joints having a three-dimensional weave architecture with fill fibers woven to provide layer-to-layer interlocking of layers of warp fiber as well as interlocking of fibers within each layer. The woven preform transfers out-of-plane loading through directed fibers to minimize inter-laminar tension. The preform has a base and at least two legs extending from the base, the base and legs each having at least two layers of warp fibers.

The fill fibers follow a weave sequence that carries them through a portion of the base, then into the legs, and finally through the opposite portion of the base. The legs can be connected at a symmetrical, distributed-column intersection, with an odd number of columns of warp fibers being located between the legs. The preform may, however, have a non-symmetrical structure, with equal or unequal leg lengths. The preform may also have an even number of columns of warp fibers between the legs, and the legs may be perpendicular or non-perpendicular or angled to the base. The legs may be parallel or angled to each other, or may have a variable width clevis in between. The outer ends of the base and/or the legs preferably have tapers formed from terminating layers of warp fibers in a stepped pattern.

Another embodiment of the present invention is a method of forming a preform for use in reinforced composite materials. The preform is formed to have a three-dimensional weave architecture with fill fibers woven to provide layer-to-layer interlocking of layers of warp fiber as well as interlocking of fibers within each layer. The woven preform transfers out-of-plane loading through directed fibers to minimize inter-laminar tension. The preform has a base and at least two legs extending from the base, the base and legs each having at least two layers of warp fibers. The fill fibers follow a weave sequence that carries them through a portion of the base, then into the legs, and finally through the opposite portion of the base. The legs can be connected at a symmetrical or non-symmetrical, distributed-column intersection, with an even or odd number of columns of warp fibers being located between the legs. The legs may be perpendicular or non-perpendicular or angled to the base. The legs may be parallel or angled to each other, or may have a variable width clevis in between. The outer ends of the base and/or the legs preferably have tapers formed from terminating layers of warp fibers in a stepped pattern.

For a better understanding of the invention, its operating advantages and specific objects attained by its uses, reference is made to the accompanying descriptive matter in which preferred, but non-limiting, embodiments of the invention are illustrated.

Terms "comprising" and "comprises" in this disclosure can mean "including" and "includes" or can have the meaning commonly given to the term "comprising" or "comprises" in US Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

BRIEF DESCRIPTION OF THE DRAWINGS

The accompanying drawings, which are included to provide a further understanding of the invention, are incorporated in and constitute a part of this specification. The drawings presented herein illustrate different embodiments of the invention and together with the description serve to explain the principles of the invention. In the drawings.

DETAILED DESCRIPTION OF THE PREFERRED EMBODIMENTS

Figure 1:
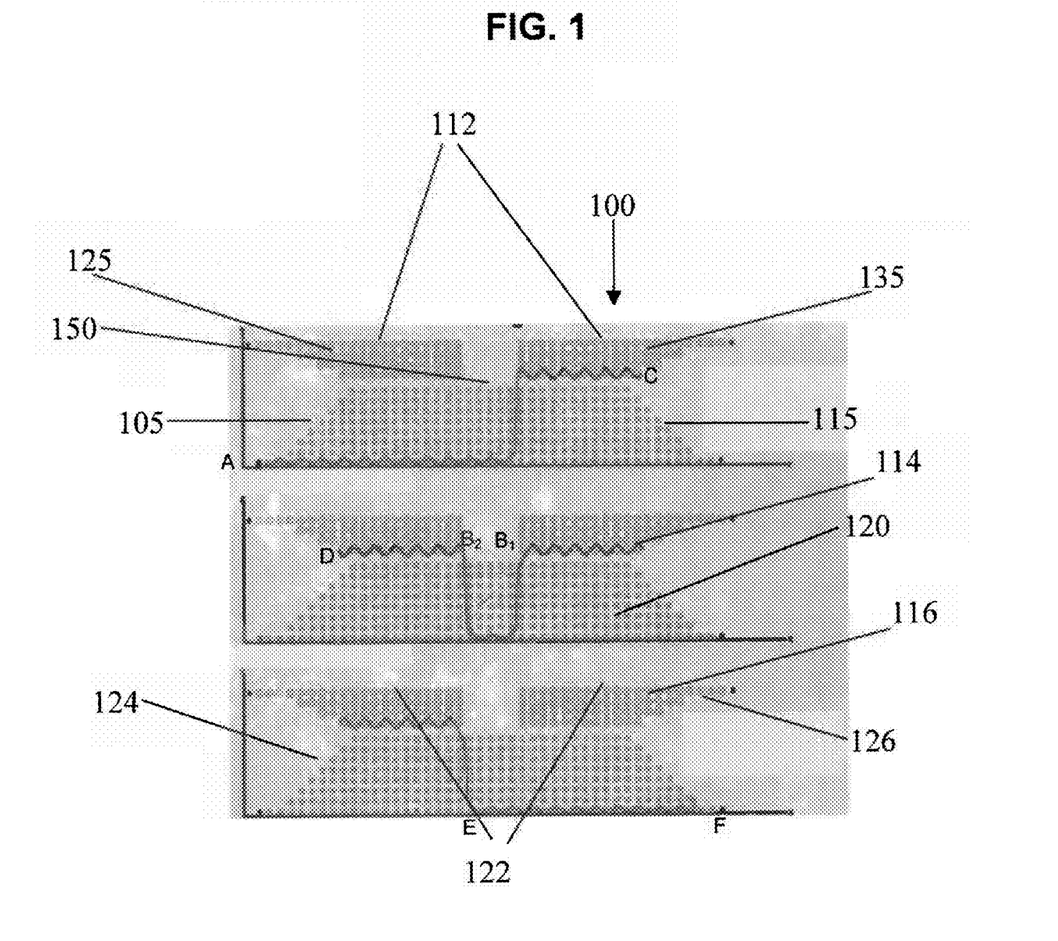
FIG. 1 is a schematic end view of a Pi-shaped preform depicting the formation of full-picks and fiber architecture therein, according to one embodiment of the invention.
Figure 2A:
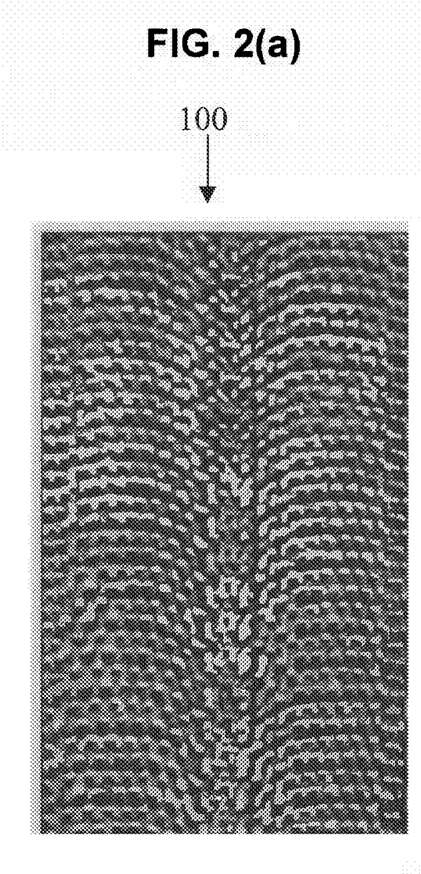
FIGS. 2(a) & 2(b) show a preform according to the invention and a preform as disclosed in a prior art, respectively.
Figure 3:
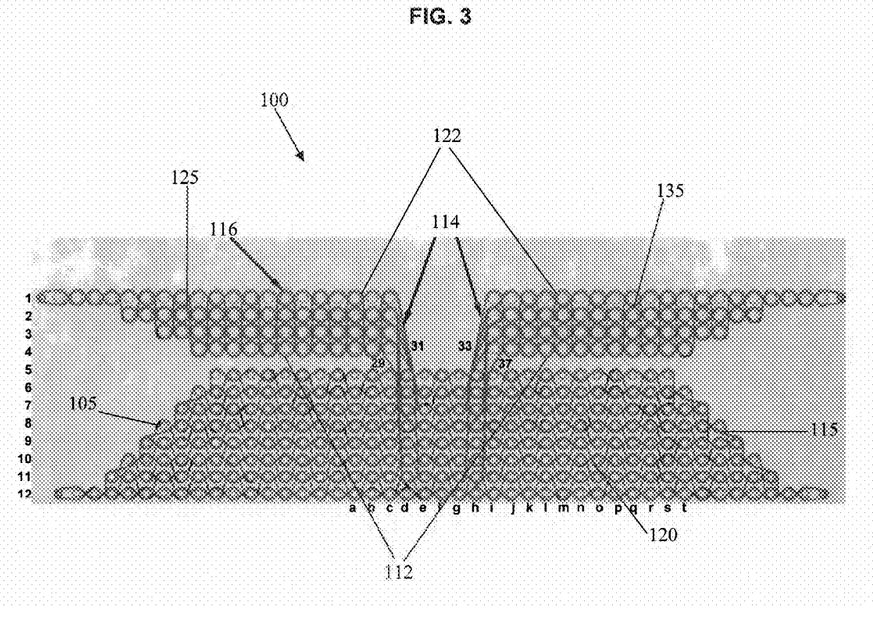
FIG. 3 is a schematic end view of a Pi-shaped preform depicting the fiber architecture therein, according to one embodiment of the invention.

FIGS. 1, 2a, 3 and 4 illustrate a preferred embodiment of a three-dimensional preform 100. Preform 100 is formed by weaving one or more fill fibers 114 in a pattern through a plurality of warp fibers 116 which extend perpendicularly to the plane of the pattern. In FIGS. 1 and 3, the complete pattern used to form Pi-shaped preform 100 is illustrated, where fill fibers 114 are shown in the viewing plane, whereas warp fibers 116 are shown as perpendicular to the viewing plane. Fibers 114, 116 are shown as spaced apart in the schematic views of the architecture, though fibers 114, 116 are compacted together when actually woven into a completed preform 100.

Turning now to FIG. 1, all warp fibers 116 in preform 100 are generally parallel to each other, with slight undulations along the longitudinal length of each fiber 116, and are arranged in generally vertical columns. Preform 100 is preferably woven from materials used for typical composite structures, for example, fiberglass and carbon fibers, and is woven to have a base 120 and at least two legs 125, 135 extending from base 120, forming a Pi-shaped profile. The legs 125, 135 may be perpendicular or non-perpendicular or angled to the base 120. Base 120 and legs 125, 135 each comprise at least two layers of warp fibers 116 and are shown as having optional tapered edges. For ease of weaving, preform 100 is woven with legs 125, 135 laid over against base 120, though legs 125, 135 are intended for use in an upright position, forming a clevis 150, such as, for example shown in FIG. 4. Base 120 is shown having eight layers of warp fibers 116, and legs 125, 135 are shown having four layers of warp fibers 116.

Optionally, as shown, warp fibers 116 in base 120 have a smaller cross-sectional area than warp fibers 116 in legs 125, 135. By using smaller warp fibers 116 only in base 120 and not in legs 125, 135, the increase in time required to weave the architecture on a weaving loom is minimized while still providing a stronger base 120 in preform 100 through a greater amount of interlocking of warp fibers 116.

Referring back to FIG. 1, preform 100 is illustrated with the weave pattern beginning at one end 105 of the base 120, which is shown at the left of base 120. In a typical portion of the weave sequence, fill fiber 114 alternates over and under warp fibers 116 of one layer during each rightward pass, interlocking fibers 116 of that layer. Also, in a typical portion of the weave sequence, fill fiber 114 alternates over and under warp fibers 116 of two adjacent layers during each leftward pass, interlocking the layers to each other. As shown in the figures and described below, portions of the weave sequence, including those within legs 125, 135, at edges, and at outer surfaces of preform 100, may differ from this weave sequence.

As shown in FIG. 1, the general weave sequence begins with fill fiber 114 at position A and extending toward the center of the base 120 and then into an outer side 112 of one of the legs 135 at position B1. The fill fiber 114 then extends to position C at the far right end right of leg 135. From position C, fill fiber 114 weaves back along the same line, toward the center of base, from which point fill fiber 114 extends downward into base 120 and back into the outer side 112 of the other leg 125 to position D at the far most left end of leg 125. Fill fiber 114 then weaves back along the same line, toward the center of base 120 and extends back into base 120 at position B2, passes through central columns of warp fibers 116 located between legs 125, 135, then back into base 120 at position E and reaches position F at the other end 115 of base 120. This forms a complete weave sequence of fill fiber 114, which basically combines four half-picks together with three full-picks, as depicted in FIG. 1. Terminating layers of warp fibers 116 in a stepped pattern form tapered edges on base 120 and legs 125, 135, such as taper 124 on the left lateral edge of base 120 and taper 126 on leg 135.

To complete one unit cell, or vertical section, the passes of fill fiber 114 across preform 100 are repeated for adjacent layers of warp fibers 116 until all layers are interlocked. The fill pattern is repeated to form adjacent vertical sections, creating continuous lengths of the preform. The interlocking of the layers is, however, not necessary, and the base 120 and/or the legs 125, 135 of the preform 100 may be bifurcated into separate layers.

FIG. 3 particularly shows the weave pattern used for forming legs 125, 135 and base 120 in a Pi-shaped preform 100. Base 120 is shown with eight layers of warp fibers 116, and legs 125, 135 are shown with four layers of warp fibers 116, though the pattern can be modified to work with more or fewer layers of warp fibers in base 120 and legs 125, 135. In other words, the base 120 can have more layers than each of the legs 125, 135 or vice versa. The weave pattern provides for interlocking of warp fibers 116 within a layer, and interlocking between layers of warp fibers. Adjacent layers are interlocked by running a portion of fill fibers 114 over a warp fiber 116 in a first layer in a first column and below a warp fiber in an adjacent, second layer in an adjacent, second column, the second layer being below the first layer. Legs 125, 135 are woven in a laid-over, horizontal position, as shown, while the pattern is woven. During installation, each leg 125, 135 is moved to a vertical, standing position, the width of each leg 125, 135 when standing upright comprising four layers.

Preform 100 is improved from previous woven preforms in providing a highly symmetrical, distributed intersection of legs 125, 135 with base 120. Base 120 has three central columns of warp fibers, and two separator columns of warp fibers, which are the adjacent columns to either lateral side of central columns. The use of an odd number of central columns allows the weave to form an approximately mirror image to either lateral side of a central plane of symmetry bisecting the central column, improving the symmetry of load distribution within base 120. While shown as having three central columns, the preferred embodiment of preform 100 may have any number of central columns, the number of central columns determining the nominal width of the clevis 150 formed when legs 125, 135 are in an upstanding position. The legs 125, 135 may be perpendicular or non-perpendicular or angled to the base 120.

To symmetrically introduce loads from legs 125, 135 into base 120, such as loads from a member (not shown) bonded between upstanding legs 125, 135, the portions of fill fibers 114 connecting legs 125, 135 are divided into groups of equal or substantially equal numbers of fiber portions. Each group intersects base 120 between one of the separator columns and central columns or between one of the separator columns and the remaining right or left lateral columns adjacent that separator column. For example, as shown in FIG. 3, group 29 extends between layers 2 and 4 of leg 125 and base 120, intersecting base 120 between columns c and d. Likewise, group 31 intersects base 120 between columns d and e, group 33 intersects base 120 between columns g and h, and group 37 intersects base 120 between columns h and i. It is to be noted here that although the figures show symmetric geometries, the method of the instant invention may be used in producing asymmetric configurations as well.

Though shown in the preferred location at approximately the center of preform 100, central columns 27 may comprise columns of warp fibers 116 located laterally from the center of preform 100. For example, columns b, c, and d may comprise the central columns, and columns a and e may act as the separator columns. This offsets legs 125, 135 toward an outer edge of base 120, though still providing symmetry in the weave of base 120 about columns b, c, and d and providing the symmetrical distribution of the load from legs 125, 135 into base 120. Tapers, such as tapers 124 and taper 126 are formed on an outer edge of a preform by terminating successive layers of warp fibers at lengths that are shorter than prior layers. For example, FIG. 3 shows layer 5 terminating at column s, whereas layer 6 terminates at column t, layer 5 being one warp fiber 116 shorter than layer 6. Likewise, layer 6 is shorter than layer 7, and this pattern repeats for each adjacent lower layer. A preform having tapered edges in either the base or upstanding legs has a better resistance to peel loads than a preform in which the warp-fiber layers all terminate at the same length. In addition, use of a smaller fiber size for the warp taper fiber provides a smoother, more gradual transition from the preform to a component to which it is joined. The weave pattern in FIG. 3 is for the eight layers of warp fibers 116 of base 120.

Figure 2B:
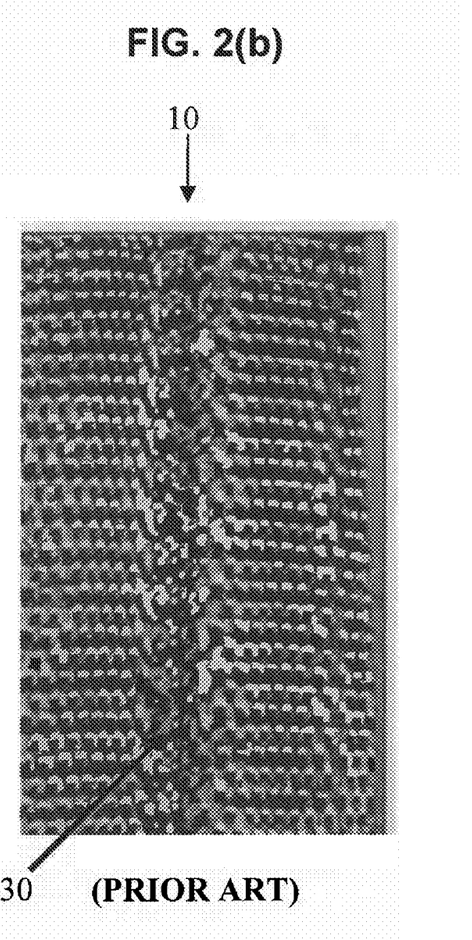
Figure 4:
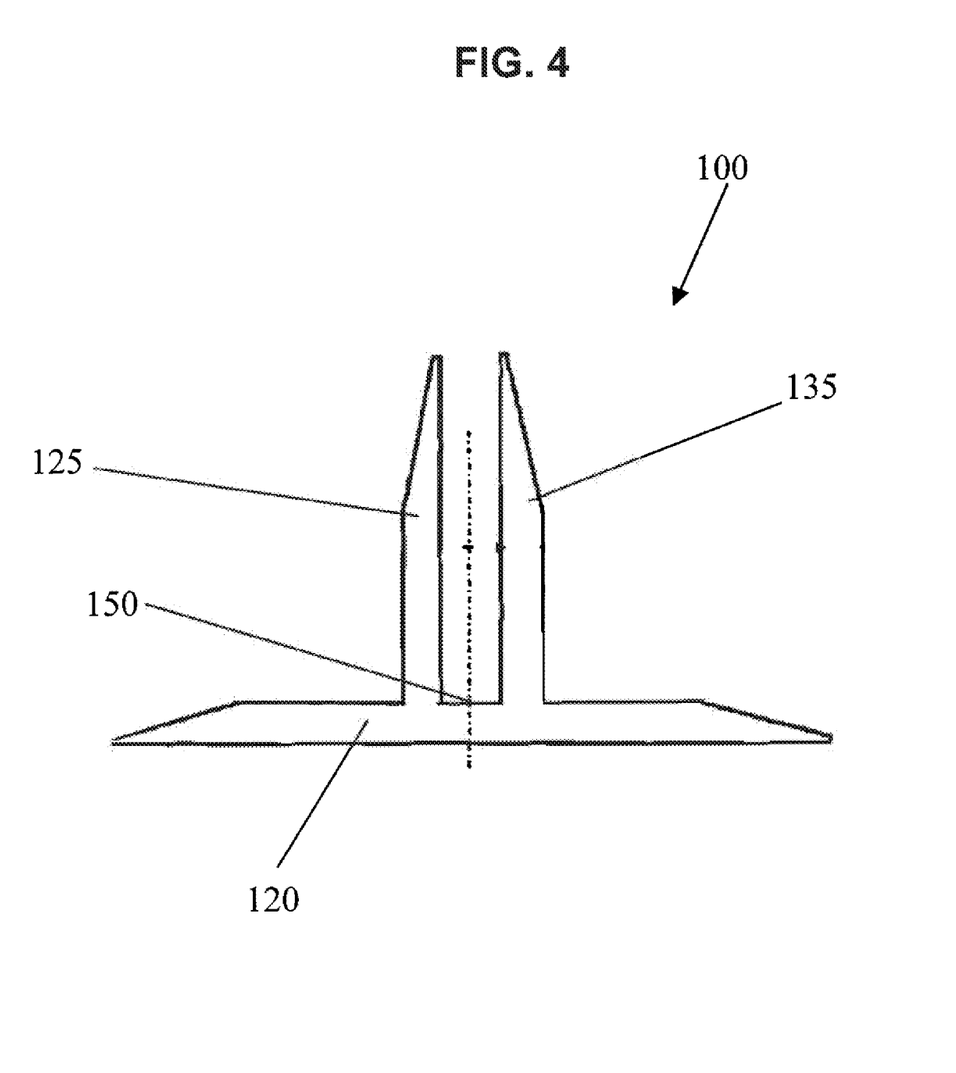
FIG. 4 is a schematic cross-sectional view of a Pi-shaped preform with legs in an upstanding position, according to one embodiment of the invention.
Figure 5A:
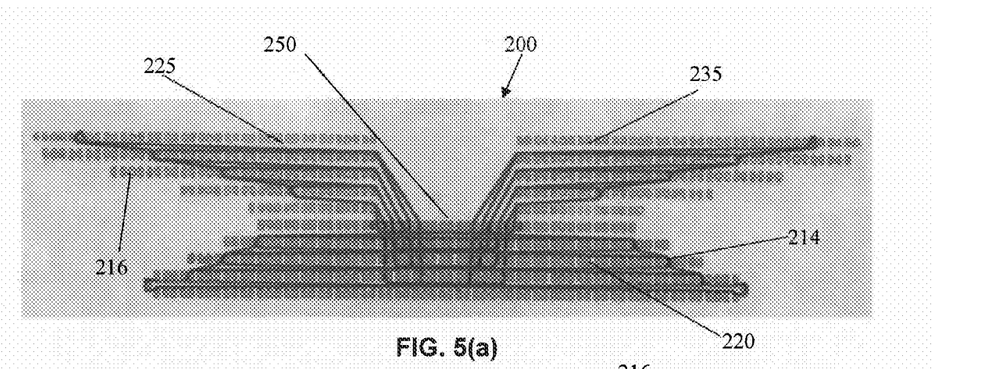
FIGS. 5(a)-5(f) are schematic end views of weave patterns or fiber architectures of Pi-shaped preforms with a variable width clevis, according to one embodiment of the invention.
Figure 5B:
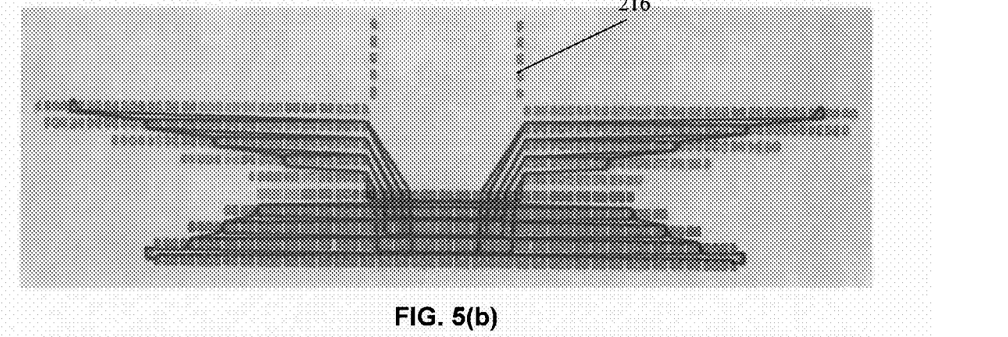
Figure 5C:
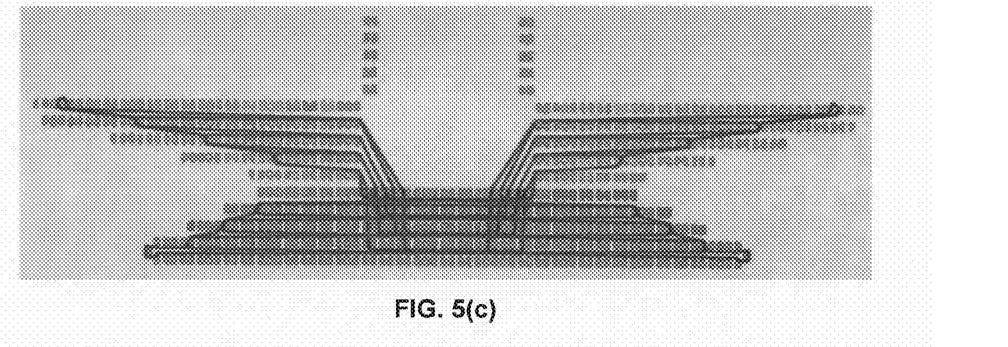
Figure 5D:
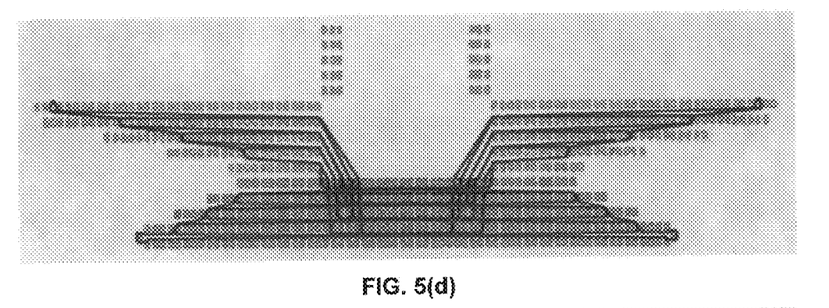
Figure 5E:
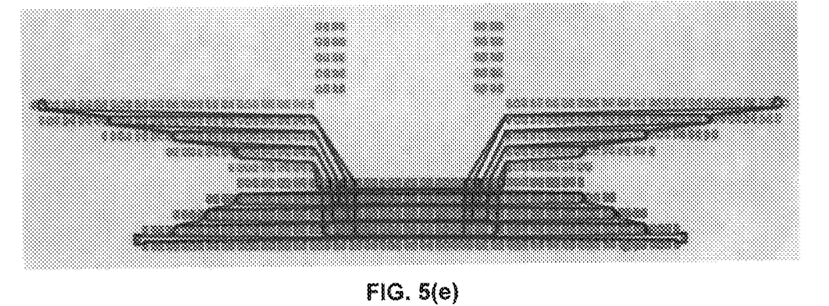
Figure 5F:
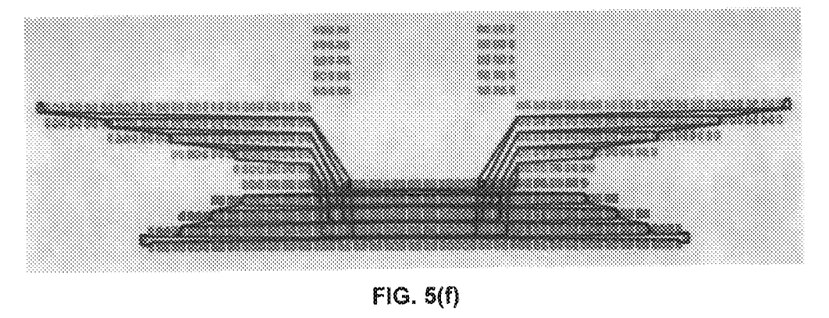
Figure 6A:
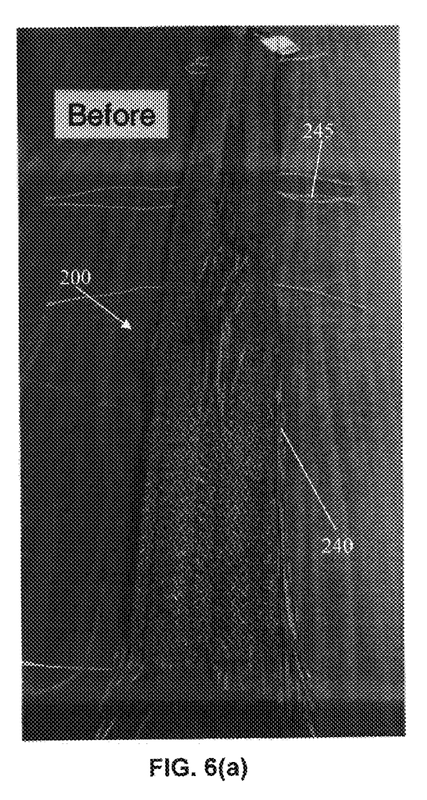
FIGS. 6(a) & 6(b) show a variable width Pi-shaped preform before (a) and after (b) float trimming, according to one embodiment of the invention.
Figure 6B:
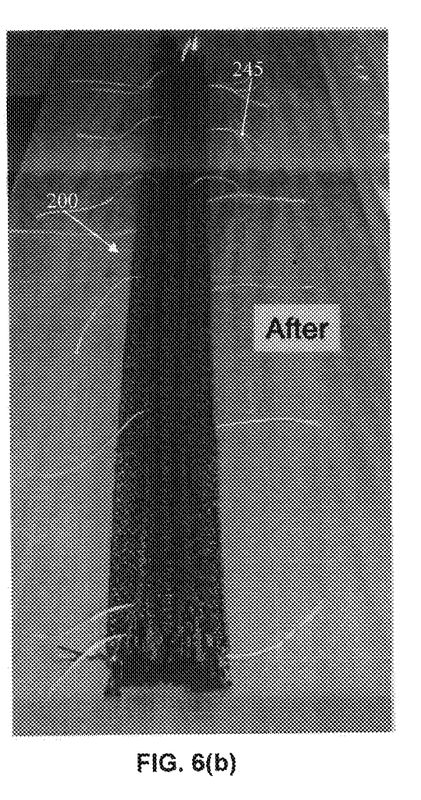

A completed, woven, Pi-shaped preform 100 is shown in FIG. 4 with legs 125, 135 in the vertical position, forming a clevis 150 between legs 125, 135. However, the legs 125, 135 may be perpendicular or non-perpendicular or angled to base 120. Preform 100 is woven by repeating the complete weave sequence to form adjacent vertical sections along the longitudinal length of preform 100. The weave process produces continuous lengths of preform 100, which are then cut to the desired lengths for installation. An example of a preform formed according to the invention in comparison with a prior art design preform 10 with loops 30 between the upstanding legs is shown in FIGS. 2(a) & 2(b), respectively.

The invention according to one embodiment is a method for weaving a preform 200 with multiple legs 225, 235 such that these legs are not necessarily parallel to each another. As shown in FIGS. 5(a)-5(f), the Pi-shaped preform 200 is formed with a variable width clevis 250 i.e. the width between the upstanding legs varies along the length of the preform. The variable width clevis 250 is achieved by selectively dropping some warp fibers 216 out of the parts of the preform that form the upstanding legs 225, 235, while simultaneously adding warp fibers 216 in other areas. To widen the clevis 250, warp fibers 216 are dropped out at the base of the upstanding legs 225, 235 and added at the tip. The opposite is done to make the clevis 250 narrower.

FIGS. 5(a)-5(f) show such movement of the clevis 250 in a series of steps. In this particular case, the width of the clevis 250 varies from 0.30 inches to 0.55 inches, for example. FIGS. 5(a)-5(f) show a cross section of the fiber architecture of the preform 200 that is perpendicular to the warp fibers 216. Individual warp fibers 216 are shown as circles, and the path of the continuous weft fiber 214 is shown as a solid line. It must be noted here that the majority of the fiber that forms the upstanding legs 225, 235 is continuous along the full length of the preform 200. Only the fibers 240 at the edges are discontinuous. These fibers 240 float above or below the woven portion of the preform 200, and are trimmed off after the preform has been removed from the loom. Different views of a variable width Pi-shaped preform that uses a ply-to-ply architecture and formed according to this embodiment are shown before and after trimming of floating fibers 240 in FIGS. 6(*a*) & 6(*b*), respectively. The glass tracer fibers 245 in these figures identify the boundaries between the constant and variable cross section zones.

The upstanding legs 225, 235, according to this embodiment, can be moved to practically any location of the supporting flange or base 220, and are tied into the flange or base 220 by the weft fibers 214. However, the position must change in a stepwise manner, where the minimum width of a step is the width of one warp column. In this example, a 20 dent reed with 20 warp fibers per inch was used, so the minimum step with was 0.05 inches (1/20 inches).

Figure 7:
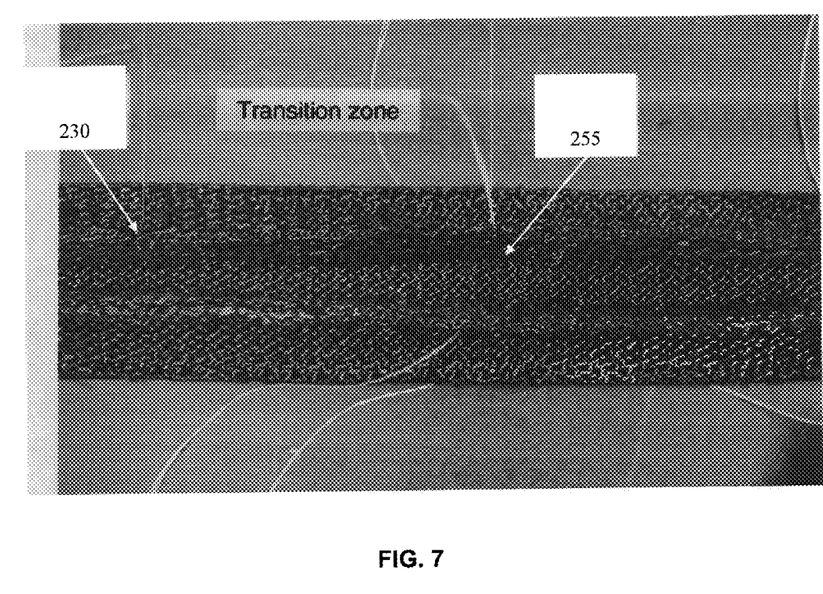
FIG. 7 is a top view of the transition zone in a Pi-shaped preform with a variable width clevis, according to one embodiment of the invention.

Preform 200 can be woven using any convenient pattern for the warp fiber i.e. ply-to-ply, through thickness angle interlock, orthogonal etc. In the preform 200 shown in FIG. 7, the clevis 250 starts out in a narrow configuration 230 and a constant cross section is woven for about 12", for example. The clevis 250 width gradually increases to a wide configuration 255, maintains the wide configuration 255 for about 8", for example, and then gradually reduces back down to the narrow configuration 230. The narrow width cross section is then woven for about 12", for example. A close up of the transition from the narrow 230 to wide configuration 255 is shown in FIG. 7. Although a gradual transition in the width of the clevis 250 is described herein, the invention is not limited to such configurations. A step change in the width of the clevis 250 or a change in width in a zig-zag fashion or combinations thereof is well within the scope of the present invention. For example, the transition in the width of the clevis 250 can be a combination of gradual and step change, or step and zig-zag, or gradual and sinusoidal, so on and so forth.

The instant method can also be used for making other cross-sectional shapes such as preforms having three or more legs intersecting with the base. The instant method can also be used to weave preforms with variable thickness or variable height legs that may be parallel or angled to each other in one or more planes.

Typically, the preforms are woven using one type of fiber, for example, carbon (graphite) fibers, for both the warp and fill fibers. However, preforms may also be hybrid weave patterns that use fibers made from multiple materials, such as carbon and glass fibers. These patterns can result in preforms having higher toughness, reduced cost, and optimized thermal-expansion characteristics. The weave patterns comprise all warp fibers of one type and all fill fibers of another type, or the weave may have warp and/or fill fibers of alternating types arranged, for example, in a "checkerboard" pattern throughout the layers.

The advantages of the present invention include the ability to weave a high strength and easy-to-use preform for assembling components into structures. The improved weave interlocks the warp fibers of each layer and interlocks the layers to each other, while distributing loads through the preform in a highly symmetrical manner. By having an odd number of columns of warp fibers in the base between the legs of the preform, a weave pattern can be mirrored about a central plane of symmetry. However, this is not necessary for the practice of the invention. The preform may as well have an asymmetrical structure, with equal or unequal leg lengths, or an even number of columns of warp fibers in the base between the legs of the preform. The legs may be parallel or angled to each other, or may have a variable width clevis in between.

The outer ends of the base and/or the legs preferably have tapers formed from terminating layers of warp fibers in a stepped pattern.

Accordingly, the invention provides for an alternative approach and/or an improved method of creating 3D preforms and/or reinforced composite structures with multiple legs such that the legs are not necessarily parallel to each another, for example, the above described Pi-shaped preform with a variable width clevis i.e. a varying width between the upstanding legs along the length of the preform.

Thus by the present invention its objects and advantages are realized and although preferred embodiments have been disclosed and described in detail herein, its scope should not be limited thereby rather its scope should be determined by that of the appended claims.

What is claimed is:

1. A method of forming a variable width clevis in a woven preform, the method comprising the steps of:
    (a) providing a plurality of adjacent layers, each layer having a plurality of warp fibers, the warp fibers being parallel to each other and forming vertical columns;
    (b) weaving a plurality of fill fibers with the layers of warp fibers to form a base and two or more legs extending from the base, wherein the fill fibers interlock the layers of the base, the layers of each leg, and the warp fibers within each layer; and
    (c) selectively dropping one or more warp fibers out of a first portion of the preform that forms a first leg, thereby widening the width of a clevis formed between said two or more legs, or selectively adding one or more warp fibers into said first portion of the preform, thereby narrowing the width of said clevis formed between said two or more legs or doing both wherein the width of the clevis varies at least along the length of the preform.

2. The method according to claim 1, further comprising the step of simultaneously adding or removing warp fibers in a second portion of the preform.

3. The method according to claim 1, wherein the columns of warp fibers include central columns of warp fibers located between the fill fibers connecting one of the legs to the base and the fill fibers connecting the other of the legs to the base, the central columns comprising an odd number of columns and allowing for a substantially mirror-image weave pattern about a central plane of symmetry of the preform.

4. The method according to claim 1, wherein the columns of warp fibers include central columns of warp fibers located between the fill fibers connecting one of the legs to the base and the fill fibers connecting the other of the legs to the base, the central columns comprising an even number of columns and allowing for a substantially asymmetrical weave pattern about a central plane of the preform.

5. The method according to claim 3, wherein the columns of warp fibers include separator columns of warp fibers adjacent opposite lateral sides of the central columns, each separator column dividing portions of the fill fibers into two groups, one group extending between the base and the leg from between the central set of columns and the adjacent separator column, the other group extending from between the separator column and the columns laterally outward of the separator column.

6. The method according to claim 4, wherein the columns of warp fibers include separator columns of warp fibers adjacent opposite lateral sides of the central columns, each separator column dividing portions of the fill fibers into two groups, one group extending between the base and the leg from between the central set of columns and the adjacent separator column, the other group extending from between the separator column and the columns laterally outward of the separator column.

7. The method according to claim 1, wherein the base has more layers than each of the legs or vice versa.

8. The method according claim 1, wherein edges of the base and/or the legs are formed tapered.

9. The method according to claim 1, wherein the legs are perpendicular or non-perpendicular or angled to the base.

10. A woven preform with a variable width clevis, the preform comprising:
- a plurality of adjacent layers, each layer having a plurality of warp fibers, the warp fibers being parallel to each other and forming vertical columns;
- a plurality of fill fibers woven among the layers of warp fibers to form a base and two or more legs extending from the base, the base and each leg being formed from at least two layers of warp fibers, the fill fibers interlocking the layers of the base, the layers of each leg, and the warp fibers within each layer; and
- a clevis formed between said two or more legs, wherein the width of the clevis varies at least along the length of the preform.

11. The preform according to claim 10, wherein said variable width clevis is formed by selectively dropping out one or more warp fibers from a first portion of the preform that forms a first leg in order to widen the width of a clevis formed between said two or more legs, or selectively adding one or more warp fibers into said first portion of the preform to narrow the width of said clevis formed between said two or more legs or doing both.

12. The preform according to claim 10, wherein the columns of warp fibers include central columns of warp fibers located between the fill fibers connecting one of the legs to the base and the fill fibers connecting the other of the legs to the base, the central columns comprising an odd number of columns and allowing for a substantially mirror-image weave pattern about a central plane of symmetry of the preform.

13. The preform according to claim 10, wherein the columns of warp fibers include central columns of warp fibers located between the fill fibers connecting one of the legs to the base and the fill fibers connecting the other of the legs to the base, the central columns comprising an even number of columns and allowing for a substantially asymmetrical weave pattern about a central plane of the preform.

14. The preform according to claim 12, wherein the columns of warp fibers include separator columns of warp fibers adjacent opposite lateral sides of the central columns, each separator column dividing portions of the fill fibers into two groups, one group extending between the base and the leg from between the central set of columns and the adjacent separator column, the other group extending from between the separator column and the columns laterally outward of the separator column.

15. The preform according to claim 13, wherein the columns of warp fibers include separator columns of warp fibers adjacent opposite lateral sides of the central columns, each separator column dividing portions of the fill fibers into two groups, one group extending between the base and the leg from between the central set of columns and the adjacent separator column, the other group extending from between the separator column and the columns laterally outward of the separator column.

16. The preform according to claim 10, wherein the base has more layers than each of the legs or vice versa.

17. The preform according claim 10, wherein edges of the base and/or the legs are tapered.

18. The preform according to claim 10, wherein the legs are perpendicular or non-perpendicular or angled to the base.

* * * * *